United States Patent [19]

Michaud et al.

[11] Patent Number: 5,684,119
[45] Date of Patent: Nov. 4, 1997

[54] SOLUTIONS OF POLYAMIDEIMIDES IN γ-BUTYROLACTONE, PROCESS FOR OBTAINING THEM AND THE YARNS THUS OBTAINED

[75] Inventors: Philippe Michaud; Jean Russo, both of Lyons, France

[73] Assignee: Rhone-Poulenc Fibres, Saint-Fons Cedex, France

[21] Appl. No.: 244,385
[22] PCT Filed: Dec. 21, 1992
[86] PCT No.: PCT/FR92/01218
 § 371 Date: Jun. 10, 1994
 § 102(e) Date: Jun. 10, 1994
[87] PCT Pub. No.: WO93/13158
 PCT Pub. Date: Jul. 8, 1993

[30] Foreign Application Priority Data

Dec. 24, 1991 [FR] France ................. 91 16338

[51] Int. Cl.$^6$ ................................ C08G 73/14
[52] U.S. Cl. ............... 528/340; 528/73; 528/84; 528/310; 528/322; 528/350; 524/111; 524/211; 524/233; 428/357; 428/395
[58] Field of Search ................. 528/350, 340, 528/170, 73, 322, 84, 310; 524/111, 211, 233; 428/357, 395

[56] References Cited

U.S. PATENT DOCUMENTS 4,950,700  8/1990  Balme et al. ................. 524/111

FOREIGN PATENT DOCUMENTS 0332543  9/1989  European Pat. Off. .

OTHER PUBLICATIONS

Patent Abstracts of Japan, vol. 7, No. 273 (C-198) (1418), Dec. 6, 1983, & JP,A,58154728 (Hitachi) Sep. 14, 1983. Copies of Both Documents Are Attached Hereto in English.

*Primary Examiner*—James J. Seidleck
*Assistant Examiner*—P. Hampton-Hightower
*Attorney, Agent, or Firm*—Watson Cole Stevens Davis, P.L.L.C.

[57] ABSTRACT

Directly shapeable clear solutions of polyamide imides and a method for preparing same are provided. The solutions are obtained by polycondensation in γ-butyrolactone (γBL) in substantially stoichiometric proportions between toluylene diisocyanate and an aromatic acid anhydride, and by dilution in (γBL) to give a solution allowing them to be processed at a later stage. Yarns and fibers made from said solutions are also described.

17 Claims, No Drawings

SOLUTIONS OF POLYAMIDEIMIDES IN γ-BUTYROLACTONE, PROCESS FOR OBTAINING THEM AND THE YARNS THUS OBTAINED

FIELD OF THE INVENTION

The present invention relates to solutions of polyamideimides which can be directly spun and processed in γ-butyrolactone. It also relates to the yarns and fibres obtained by solution-spinning of these solutions.

It also relates to a process for obtaining solutions exhibiting an improved colour.

BACKGROUND DISCUSSION

It is already known, according to FR 2,079,785, to prepare solutions based on polyamideimides in N-methylpyrrolidone, but the solutions and the polymers thus obtained exhibit an intense dark colour limiting the possibilities of subsequent colouring of the articles formed from these solutions.

It is also known, according to FR 2,627,497, to prepare directly spinnable solutions based on polyamideimides, by polycondensation in γ-butyrolactone, followed by dilution at a temperature of 120° to 165° C. in another solvent to obtain a polymer concentration of 5 to 30%, the weight proportion of the reaction solvent to the diluent solvent being between 40/60 and 80/20. The use of γ-butyrolactone as solvent for the polycondensation of the polyamideimides, even jointly with a diluent solvent of the amide type, enables the colour of the polyamideimide solutions to be improved. However, such solutions are only of limited interest because it is difficult to avoid completely the precipitation of the polymer after a few months.

In addition, the use of a cosolvent does not promote the elimination of the colour and, during the subsequent conversion of these solutions, the simultaneous presence of two solvents is found to be complicated and relatively uneconomical industrially.

SUMMARY OF THE INVENTION

It has now been found, and this is what forms the subject of the present invention, that it is possible to prepare solutions of polyamideimides in γ-butyrolactone as the only solvent. More particularly, it relates to clear solutions of polyamideimides (PAI) which can be directly spun and processed, containing:

a) a polyamideimide comprising amideimide repeat units of formula:

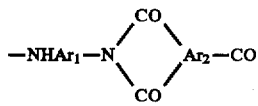

in which:

Ar$_1$ denotes the tolylene divalent aromatic radical,

Ar$_2$ denotes a trivalent aromatic radical and b) as sole solvent, substantially anhydrous γ-butyrolactone free from butyl alcohol in sufficient quantity to enable solutions to be formed, generally from 5 to 35%.

The solutions according to the present invention are practically free from any undesirable colour.

The present invention also relates to a process for obtaining clear solutions which can be directly spun and processed based on polyamideimides, including the reaction, carried out in substantially anhydrous γ-butyrolactone (γ-BL) free from butyl alcohol as polycondensation solvent, in substantially stoichiometric proportions, between:

tolylene diisocyanate, an aromatic acid anhydride, preferably trimellitic anhydride, the concentration of polyamideimide in the γ-BL being at least 27%, preferably approximately from 27 to 50%, at a temperature increasing from the ambient to approximately 200° C., and then addition of γ-butyrolactone (γ-BL) to obtain a concentration permitting the subsequent conversion.

The final PAI concentration which is suitable for spinning or filming is generally between 5 and 30%.

DETAILED DESCRIPTION OF THE PREFERRED EMBODIMENTS

The γ-butyrolactone employed must be substantially anhydrous, that is to say it must contain less than 500 ppm of water; it must also be free from butyl alcohol, that is to say it must contain less than 500 ppm of butyl alcohol, to avoid any secondary reaction.

The tolylene diisocyanate (TDI) generally employed is commercial TDI, which is in the form of a mixture of 2,4-TDI and 2,6-TDI in a proportion of at least 60% of 2,4-TDI, preferably 80% of 2,4-TDI and 20% of 2,6-TDI.

A minor proportion of another aromatic diisocyanate may be optionally added to the TDI to improve certain properties of the processed articles obtained.

Trimellitic anhydride will be preferably employed as acid anhydride.

On the other hand, in contrast with the teaching of FR 2,079,785 and FR 2,627,497, the polyamideimides according to the present invention must not contain more than 5% of units originating from other aromatic diacids such as terephthalic acid or an alkali or alkaline-earth metal dicarboxybenzenesulphonate to avoid precipitating the polymer.

In fact, as will be seen later in the examples, the presence of such compounds in a proportion of 20 mol % results in the precipitation of the PAI obtained in γ-BL at ambient temperature, with the result that such solutions can neither be stored nor directly processed industrially.

Similarly, the use of certain diisocyanates other than TDI, for example 4,4'-diphenyl ether diisocyanate and 4,4'-diphenylmethane diisocyanate results in precipitations making such solutions unusable industrially.

The polycondensation reaction takes place at increasing temperature between ambient temperature and 200° C., preferably between 100° and 200° C. during at least three hours, with a polyamideimide concentration of between 27 and 50%, preferably 30 and 35%. The PAI concentration is then adjusted to the desired value, generally at the polycondensation temperature. However, the adjustment of the concentration can also be carried out subsequently, at lower temperature, the solutions thus obtained remaining clear and homogeneous whatever the temperature, including ambient temperature, with the result that such solutions can be stored at ambient temperature, without deteriorating; they do not exhibit any precipitation or subsequent appreciable change in viscosity.

Such solutions also have the advantage of not being highly coloured.

The solutions according to the invention can be obtained noncontinuously or continuously by means of any suitable apparatus.

Finally, the present invention also relates to the yarns and fibres obtained by solution-spinning of the solutions described above.

The solutions according to the invention are processable, in particular spinnable by wet or dry spinning processes which are well known to a person skilled in the art. The yarns and fibres thus obtained have the advantage of being very slightly coloured.

In the tests which follow, the values of Mn and Mw are determined by gel exclusion chromatography (GPC) in N-methylpyrrolidone at 80° C. and 0.1 mole/liter of lithium bromide, the masses being expressed in relation to a polystyrene calibration.

The polydispersity value I corresponds to the ratio Mw/Mn.

The examples below illustrate the present invention without limiting it.

EXAMPLE 1

| Reactants: | | | |
|---|---|---|---|
| reaction solvent: | | | |
| γ-butyrolactone (γ-BL) of Prolabo trademark | 335.6 | (d = 1.13) | 297 ml |
| trimetallic anhyydride (TMAN) | 124.8 g | ... | 0.65 mol |
| tolylene diisocyanate (commercial TDI: Scuranate ® from RP) | 113.1 g | ... | 0.65 mol |
| diluent solvent (γ-BL) | 334.2 g | (d = 1.13) | 304.5 ml |

The monomers cited above and the reaction solvent are introduced in the proportions shown into a stirred reactor fitted with a reflux condenser, a nitrogen inlet, a thermostated oil bath and a dropping funnel for adding the dilution solvents. The temperature is gradually raised from ambient temperature to 198° C. over approximately two hours and the reaction mixture is left at 198° C. for 95 minutes. The concentration is then 35%.

The γ-BL diluent is run into the reactor during 15 minutes and the reaction mixture is gradually cooled in order to be stored. The concentration is then 21%.

The viscosity of the solution at 25° C. is 1147 poises.

The solution is very slightly coloured.

EXAMPLE 2

| Reactants: | | | |
|---|---|---|---|
| reaction solvent: | | | |
| γ-butyrolactone (γ-BL) of Prolabo trademark | 334.2 g | (d = 1.13) | 296 ml |
| trimellitic anhydride (TMAN) | 99.84 g | ... | 0.52 mol |
| terephthalic acid (TA) | 17.26 g | ... | 0.104 mol |
| sodium 3,5-dicarboxybenzene-sulphonate (NaAIS) | 6.97 g | ... | 0.026 mol |
| Polylene diisocyanate (Scuranate ® commercial TDI from RP) | 113.1 g | ... | 0.65 mol |
| diluent solvent (γ-BL) | 342.8 g | (d = 1.13) | 303 ml |

The operation is carried out in the apparatus shown above and under the same conditions, except for the stage of holding at 198° C., which lasts 130 minutes, to reach a sufficient viscosity.

The polyamideimide is completely soluble when the temperature of the reaction mixture reaches 198° C.

The γ-BL diluent is added continuously while the temperature drops from 198° to 146° C. The polymer is still soluble. On the other hand, during the cooling, the polymer precipitates completely and the solution is then unusable industrially.

EXAMPLE 3

| Reactants: | | | |
|---|---|---|---|
| reaction sovent: | | | |
| γ-butyrolactone (γ-BL) of Prolabo trademark | 382.8 g | (d = 1.13) | 339 ml |
| trimellitic anhydride (TMAN) | 76.8 g | ... | 0.4 mol |
| 4,4'-diphenylmethane diisocyanate (MDI) | 113.1 g | ... | 0.65 mol |
| diluent solvent (γ-BL) | 149.9 g | (d = 1.13) | 132.5 ml |

The monomers cited above and the reaction solvent are introduced in the proportions shown into a stirred reactor fitted with a reflux condenser, a nitrogen inlet, a thermostated oil bath and a dropping funnel for the addition of the diluent solvents. The temperature is raised gradually from the ambient temperature to 198° C. over approximately two hours and the reaction mixture is left at 198° C. for 2 hours.

The γ-BL diluent is run into the reactor during 10 minutes and the reaction mixture is cooled gradually in order to be stored.

At the end of several hours the temperature has dropped back to 22° C. and the polymer has precipitated completely.

The solution becomes unusable industrially.

We claim:

1. A storable clear solution of polyamideimides which can be directly spun and processed, consisting essentially of:
   a) a polyamideimide in which at least 95% of the repeat units are denoted by the formula —NH—$Ar_1$—N(CO)$_2Ar_2$—CO— in which:
      $Ar_1$ denotes the tolylene divalent aromatic radical,
      $Ar_2$ denotes a 1,2,4-benzenetriyl trivalent radical, and
   b) as sole solvent, substantially anhydrous gamma-butyrolactone free from butyl alcohol.

2. The solution according to claim 1, wherein final concentration of polyamideimide is between 5 and 35%.

3. The solution according to claim 1, wherein $Ar_1$ denotes a mixture of 2,4-tolylene and 2,6-tolylene radicals in a proportion of at least 60% of 2,4-tolylene.

4. A process for obtaining storable clear spinnable solutions of polyamideimides, comprising polycondensing at elevated temperature in substantially stoichiometric proportions:

tolylene diisocyanate, and
   an aromatic acid anhydride in substantially anhydrous γ-butyrolactone (γ-BL) free from butyl alcohol to form a mixture of polyamideimide in the γ-BL, wherein the aromatic acid anhydride is at least 95% trimellitic anhydride, the concentration of polyamideimide in the γ-BL before dilution being at least 27%, diluting with the same solvent the concentration of polyamideimide in the γ-BL at a temperature of at most the polycondensation temperature and cooling the diluted concentration of polyamideimide in the γ-BL to ambient temperature thereby obtaining a clear storable spinnable solution of polyamideimide.

5. The process according to claim 4, wherein the tolylene diisocyanate is in the form of a mixture of 2,4-tolylene and 2,6-tolylene, said mixture containing at least 60 % of 2,4-tolylene diisocyanate.

6. The process according to claim 4, wherein the aromatic acid anhydride employed is trimellitic anhydride.

7. The process according to claim 4, wherein the concentration of polyamideimide before dilution is between 27 and 50%.

8. The process according to claim 4, wherein the final concentration of polyamideimide is between 5 and 30%.

9. A yarn obtained from the solution according to claim 1.

10. A fiber obtained from the solution according to claim 1.

11. The solution according to claim 1, wherein said solution is storable at ambient temperature without precipitation.

12. The solution according to claim 1, wherein said solution is homogeneous at ambient temperature.

13. The solution according to claim 3, wherein said proportion is at least 60% of 2,4-tolylene.

14. The solution according to claim 13, wherein said proportion is at least 80% of 2,4-tolylene.

15. The process according to claim 4, further comprising storing the solution at ambient temperature without precipitation.

16. The process according to claim 5, wherein said mixture contains at least 80% of 2,4-tolylene diisocyanate.

17. The process according to claim 7, wherein the concentration of polyamideimide before dilution is between 30 and 35%.

* * * * *